United States Patent Office 3,302,744
Patented Feb. 7, 1967

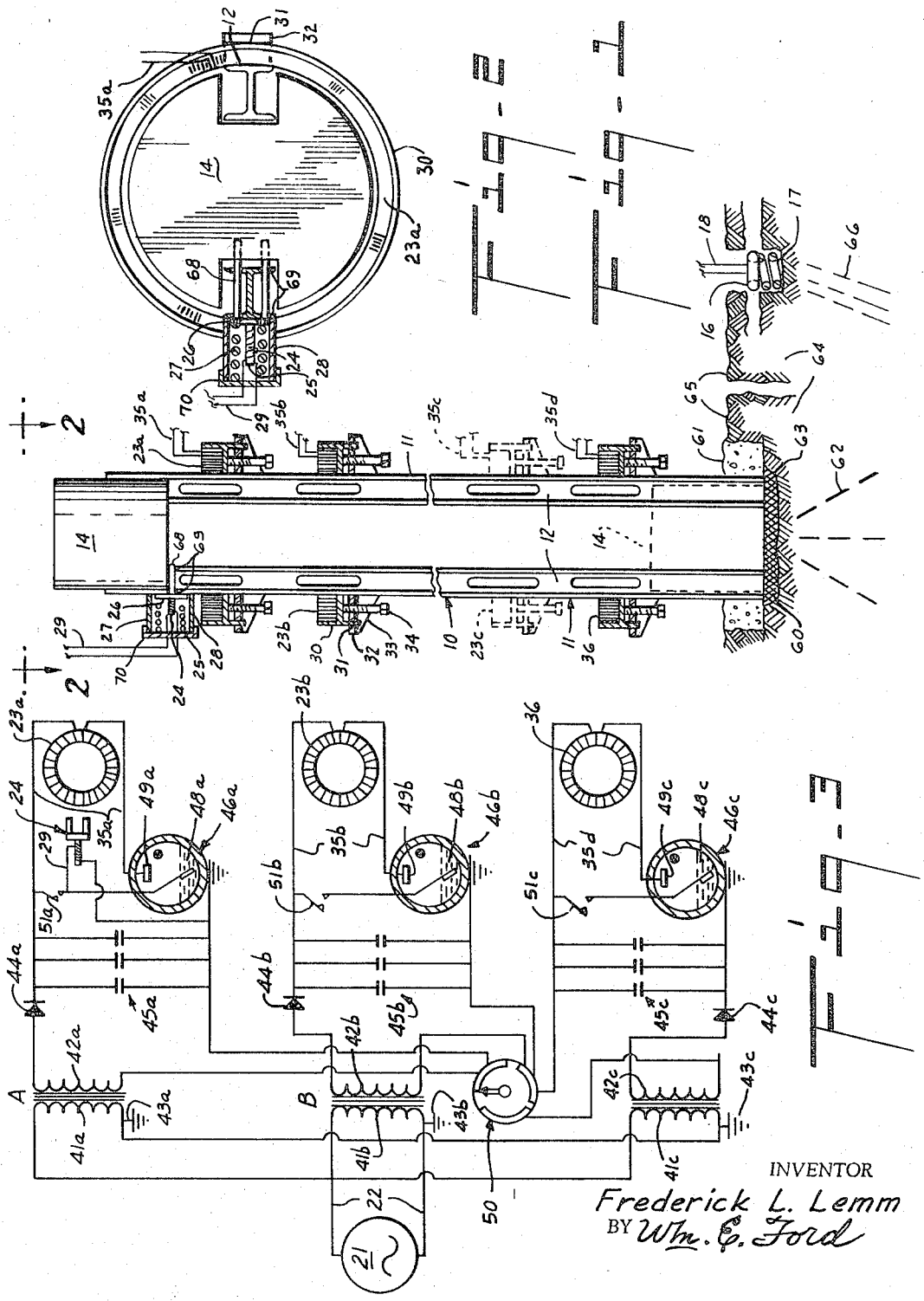

3,302,744
ELECTRO-MAGNETIC ACCELERATION METHOD OF INCREASING IMPACT OF DROPPED BODY AND APPARATUS THEREFOR
Frederick L. Lemm, 5411 Pocahontas, Bellaire, Tex. 77401
Filed Dec. 2, 1963, Ser. No. 327,375
6 Claims. (Cl. 181—.5)

This invention relates to the method of increasing the impact of a dropped body by adding electro-magnetic acceleration to the acceleration of gravity applicable to a dropped body as it falls, the force of impact thereby being greatly multiplied due to the greatly accelerated velocity with which the mass of the dropped body strikes its object, as the earth.

The invention can have an applied relation to a method of setting up vibrations from the impact of the body upon the earth with the vibrations being of such great force and effect that they pass downwardly into the earth to be reflected from various levels with such intensity that under many circumstances it is not necessary to place vibration detectors at any great depth in the weathered zone or overburden area of the earth to pick up these reflected vibrations.

In further extension, the invention has applied relation to this method of setting up vibrations of intensified force in manner that it is not necessary to pierce the weathered zone or overburden of the earth's surface to set up vibrations of such intensity that they can be relied upon to be reflected back with accuracy from the various levels, but rather the force of impact of the shock or vibration creating element is so great that vibrations of requisite intensity may be set in motion downwardly from the earth's surface.

It is a primary object of this invention to provide a means of multiplying the intensity of vibrations set in motion by a dropped body and to provide apparatus for accomplishing this intensification of impact by electro-magnetic acceleration means.

It is also a special object of this invention to produce such multiplied vibrations in the earth and means for accomplishing same in manner that the vibrations set in motion may be reflected back to the surface of the earth at predetermined points surrounding the source of vibration so that the reflected vibrations may pass to spaced apart oscillographs which plot the amplitude, frequency and wave form of the reflected vibrations in manner that geophysical interpretations may be made of the pattern of reflections.

It is also another object of this invention to employ electro-magnetic acceleration means and methods to set up vibrations of multiplied intensities in the earth to be returned and interpreted by conventional means whereby the geophysical characteristics of the shocked earth segment below the vibrator may be projected.

It is another and further object of this invention to provide a plurality of induced magnetism coils to accelerate the fall of a dropped body, one taking over as the time interval of a preceding coil nears expiration.

It is still another and further object of this invention to provide a magnetic means for returning a dropped object to initial lifted position.

It is another and further object of this invention to provide apparatus of this class in which the accelerating force or magnetic means is physically disposed in direction of fall in advance of the body to be dropped; also, the object provides means for returning the dropped object to initial position with such means being located in advance of the dropped object in direction of return.

Other and further objects will be apparent when the specification herein is considered in connection with the drawings, in which:

FIG. 1 is an elevational view, part in section, showing an embodiment of the invention with mass in raised position at the top of the column, the disposition of magnets being shown, and also an exemplary pick-up coil being shown spaced from the base of the column, better to illustrate picking up waves reflected back from down in the earth;

FIG. 2 is an enlarged scale plan view, taken along line 2—2 of FIG. 1; and

FIG. 3 shows circuit diagrams in detail for operating the magnets, including the weight return magnet, and the sequence by which the magnets are successively set in operation.

Referring now in detail to the drawings, in which like reference numerals are applied to like elements in the various views, a vibrator or drop column 10 is shown in FIGS. 1 and 2 inclusive, to comprise two spaced apart H-beams 11 supported vertically in a concrete base 61 with webs 12 in alignment and adjacent flanges 13 in opposition. A mass of magnetic material 14 of predetermined weight, and comprised, for instance, of a cylinder of nickel steel, has oppositely disposed notches or grooves 15 therein which are of size to permit the mass 14 slight clearance from the flanges 13 of the H-beam 11 as it may be accelerated in falling down the drop column or vibrator column 10 to react with an intensified impact or shock upon the earth 60 at the base of the column 10. This sets in motion vibration or signal waves 62 to be transmitted downwardly into the earth in all directions with such vibrations being reflected back to the earth's surface from the various formations and subterranean eccentricities encountered. The reflected signals, as aforesaid, are to be received in point of time and in degree of intensity by pick-up coils disposed in prepared shallow holes in the surface of the earth; FIG. 1 showing one such coil 16 in a hole 17 therefor. The earth 60 upon which the mass 14 falls is shown in FIG. 1 as compacted and strengthened, as indicated by the cross-hatching being shown intensified, whereas the earth 63 outwardly therefrom is shown less compactly cross-hatched to indicate the normal density of the weather layer or overburden 64 immediately beneath the earth's surface 65.

The return signals or impulses 66 reflected to the pick-up coils 16, as shown in FIG. 1, are conventionally conducted electrically by means of electrical conductors 18 to oscillographs arranged in a conventional truck or motor vehicle, not shown, which is located at some distance from the shock column 10 so that the delicate readings conventionally taken therein by oscillographs may not be affected by the strong impulses emanated from the dropping of the mass 14.

A source of electrical power, as for operating the magnets, may be carried by a second conventional truck, not shown, but which should be positioned in operation in close proximity to the drop column 10. As the conventional source of electrical power, the second truck may carry a conventional alternating current generator 21, shown diagrammatically in FIG. 3, which supplies the power through conductors 22 to operate the oscillographs in the first truck, not shown. Also, this alternating current generator 21 supplies the power to energize a series of magnetic coils 23a, 23b, 23c and 36 which are shown in FIG. 1 as disposed on the column 12 so that the centers of buoyancy thereof are spaced from the magnetic mass 14 predetermined distances as will be hereinbelow described.

As shown in FIGS. 1 and 2, a solenoid 24 includes a stop plate or collar 26 from which the armature 25 of the solenoid extends centrally, outwardly therefrom, while two horizontally spaced apart latch prongs 68, rigidly connected to said collar 26, extend inwardly through aligned bores 69 in the outer and inner flanges 15 of the left support column 11, and on opposite sides, and closely adjacent to the web 12 of the left drop column 11.

The armature windings 29 extend outwardly from the armature 25 through a cap 70 of a retainer cup or housing 78 which surrounds the collar 26, and such windings extend to a circuit in the truck 20 to be hereinbelow described, which automatically energizes the armature windings 29 at predetermined intervals whereby the armature 25 is moved outwardly to withdraw the prongs 68 outwardly thereby releasing the mass 14 to fall.

The de-energization of the windings 29, at the expiration of the cycle accelerated by the upper magnet 23a, frees the armature 25 to be returned to the position shown in FIGS. 1 and 2, with the latch prongs 68 fully extended inwardly, as urged by a spring 27 which surrounds the armature 25 and bears inwardly against the stop collar 26 and outwardly against the cap 70, which closes the solenoid housing 28, as aforesaid.

The electrical current which energizes the solenoid 24 is supplied by the conductors 29 from a circuit, shown in FIG. 3, which energizes the uppermost coil 23a, the alternating current generator 21 on the truck 20 supplying the current for such circuit.

Each magnet 23a and 36, and others, as needed, is positioned on the column 10 by support means therefor on each H-beam, a T 30 being shown on opposite sides of the column with the central leg of each T connected to the column so that the magnet seats on this central leg with the outer periphery of the magnet being constrained by the upper part of the flange of the T. The lower part of the flange of each T 30 may then be extended into a slot 31 provided in a plate 32 which is welded to a respective H-beam, a gusset 33 being provided to support the plate 32.

An adjustment bolt 34 is shown threaded through the plate 32 to bear upwardly on the underside of the web of each T 30. Thereby the magnetic coils may be adjusted on each H-beam to position the coil carried thereon at a desired predetermined elevation.

As shown in FIG. 1, the current for energizing the magnets is supplied through conductors 35a, 35b, 35c and 35d, which are in turn supplied with current from the generator 21 shown in FIG. 3.

When the mass 14, as lifted by the action of the lower or return magnet 36, is moved up into contact with the prongs 68, the force of the lifting of the mass is enough for the prongs 68 to be urged outwardly against the tension of the spring 27 to let the mass 14 pass thereabove. The spring 27 may then urge the prongs 68 inwardly and under the mass 14, which then may rest upon the prongs 68 for support.

A circuit diagram for operating the two uppermost acceleration coils 23a and 23b, and a return coin 36 is shown in FIG. 3 as including three transformers A, B and C comprising three primary transformer coils 41a, 41b and 41c, supplied by the alternating current generator 21, and disposed opposite the respective secondary transformer coils 42a, 42b and 42c in one-to-one ratio as to windings. Functionally these transformers are employed for the purpose of isolating the circuits supplied thereby so that they are not subjected to the conventional tremendous surges of current, grounds 43a, 43b and 43c being provided in the secondary circuits to ground out any extraneous voltages which may be induced.

The respective secondary windings have rectifiers 44a, 44b and 44c therein to convert the alternating current to direct current for recharging banks of capacitors 45a, 45b and 45c.

The secondary circuits include respectively gas discharge tubes 46a, 46b and 46c, which are actuated to "fire" the tubes, thereby discharging the capacitor banks 45a, 45b and 45c.

The negative conductors of these secondary circuits are connected at one end thereof to the mercury pools 48a, 48b and 48c, with the grounds from the mercury pools being conventionally established through the metallic envelope of the tubes.

The anodes 49a, 49b and 49c of the respective tubes are connected to the negative terminals of the coils, and the secondary circuits negative conductors are connected into a timer 50 interposed between the negative sides of the capacitor bank and the negative sides of the secondary coils. Push buttons 51a, 51b and 51c are shown in the three secondary circuits for manually operating the respective circuits.

The timer 50 is of a conventional type, operative mechanically or electrically, which determines the successive time intervals of pulses or the respective cycle of mass movement which in detail comprises the interval following the release of the mass 14 and the energization of the top coil 23a and the energization of the lower or return coil 23d after the mass 14 has struck the ground. Thus, the timer 50 can be set to automatically control a cycle or predetermined time interval between successive droppings of the mass 14.

The invention employs the effects of magnetism in connection with the fall of a weight to set up vibrations in a novel manner. It has been discovered that a steel weight suspended vertically above the earth's surface, may be accelerated at any point in its free fall by dropping it through a time limited, pulsed electromagnetic field. The reaction force at the time of impact with the earth's surface will be increased in direct proportion to the increase in velocity, and the resulting reflected shock waves can be returned to the earth's surface with such force that the received signals are adequate after passing through the weather layer or overburden of the earth's surface. Thus, it is not necessary to dig holes through the overburden and set off explosive charges from the bottoms of the holes in order to obtain adequate returned signals.

As $S = \frac{1}{2}gt^2$, a 1,000 pound steel weight, suspended 16 feet above the earth's surface, will strike that surface in one second. Also the average velocity over a 16 foot drop = 16 feet/second. At this distance, velocity and acceleration are equal and the resulting force equals 1,000 lbs. × 16 feet or 16,000 foot pounds, and the potential energy equals 1,000 pounds × 32 × 16 feet = 256,000 foot pounds, and the kinetic energy equals $\frac{1}{2}$ (1,000 × 32²) or 512,000 foot pounds.

On impact with the earth's surface, with dimensions unchanged, and an assumed reaction time of 0.001 second, a reaction force of $$\frac{256{,}000 \text{ foot pounds}}{.001 \text{ second}}$$

or 256,000,000 foot pounds of energy is obtained. If the acceleration is doubled a 1,000 pound mass of steel, whose volume is about two cubic feet, dropped through a magnetic field of a predetermined density will result in 512,000,000 foot pounds of energy.

With this phenomenal amount of energy obtainable by the use of magnetic acceleration it is obvious that the mass to be dropped can be appreciably reduced from that mass which is dropped mechanically without magnetic acceleration. For instance, in the McCollum type "thumping" machines, a three ton metal weight is dropped mechanically from a height of 9 feet in order to obtain reflections comparable to those obtainable by dynamite, as set forth in detail graphically in FIG. 5.

Also, the reduction of size of apparatus and cost obtained by this invention as balanced against a device setting up sound waves by a gas explosion at the surface and the consequent fallacies of distribution of impact, gives a favorable comparison, especially as compared with those devices which provide an 18 ton vehicle equipped with a gas explosive chamber to explode gas operative over a larger area at the surface than that at the base of the column of this invention, while only obtaining, say a 100,000 foot pound seismic impulse.

As can be seen by the disclosure herein, a device which depends upon magnetic acceleration to obtain the release of a tremendous amount of energy by a quickly automatically and regularly obtained impulse, which may be quickly, automatically and regularly repeated to any extent desired, can be relied upon to revolutionize present seismic exploration practices.

The invention is adapted to be employed in geophysical exploration to obtain improved geophysical vibrations to be recorded and more effectively interpreted, while eliminating both apparatus and personnel now employed in conventional geophysical exploration.

For instance, conventionally, a drilling rig truck with a water truck as an adjunct, with crews therefor, are sent out, and both apparatus and personnel thus involved can be eliminated, since with the instant invention it is not necessary to drill shot holes for receiving the dynamite charges conventionally set off to create vibrations to be recorded and interpreted. Also in addition to the trucks and crews for providing the shot holes, a shooters' truck is sent out carrying dynamite with a shooting crew to set off the dynamite charges which set up the vibrations in the earth conventionally picked up as reflected and recorded and interpreted. Such a truck and crew may be eliminated by this invention which creates vibrations by the fall of the aforesaid hammer accelerated by magnetism.

It can thus be seen that this invention is the greatest of time and labor savers, both as to initial set-up and as to the time and cost of operation, the reduction of personnel in itself amounting to extensive savings realizable from inception of its use.

However, since the weathered zones or overburden 64, just below the earth's surface, may vary in density and character, it may be necessary on occasions to position the pick-up coils 16 at deeper distances below the earth's surface than indicated in FIG. 1 of this disclosure. However, since holes of substantial depth can be dug with conventional powered tools of capabilities much greater than the manually operable auger, it should not be necessary to call into performance on these occasions apparatus on the expensive caliber and performance scale of an auxiliary drilling rig.

The invention herein is not limited to the exact means of manipulating the force of magnetism to accelerate the fall of a drop weight but other means and methods are also considered. Also the invention is susceptible to convenient changes in structural elements, for instance the non-magnetic, steel column 10, which requires lightening slots 89 therein opposite the magnetic coils to minimize hysteresis eddy currents, stray fields and effects, may be omitted as in case the non-metallic columns 10 are employed.

Also, the shape of the dropped weight 14 does not have to be limited to that of a grooved cylinder as shown in FIG. 3, but rather the weight may be of any shape and the fall or descent guided by a variety of means, although a full cylindrical shape may be preferable.

The latch means is susceptible to variation in that it may be desired to install a solenoid 24 in opposed H-beams 11, thereby the solenoid support for the mass 14 might be more balanced. Also, with a timer 50 it could be possible to lengthen the column 10 or change the period of discharge of the capacitor bank 45c of the lift coil 36, and thus the discharge of the capacitor bank 45c would be followed by the mass 14 reaching top travel almost immediately thereafter, with the uppermost acceleration magnet 23a being so positioned in elevation thereunder, and having such a timed capacitor bank discharge, that a successive cycle could be entered without the necessity of a latch to be forced by the mass 14 on upward travel, and electrically released to start a new cycle.

In effect the invention is not limited to the structures and methods hereinabove disclosed, but rather the invention includes other structures and methods which may be suggested by their relation to the disclosure set forth, as long as such may fall within the broad spirit of the invention and within the broad scope of interpretation claimed for, and merited by, the appended claims.

What is claimed is:

1. The method of setting up impact vibrations in the earth comprising lifting a mass of magnetic material of predetermined weight to a predetermined elevation above the earth's surface, releasing the weight to fall by gravity and abetting the fall by the acceleration of induced magnetism successively by magnetic coils spaced one above the other.

2. The method of setting up impact vibrations in the earth comprising lifting a mass of magnetic material of predetermined weight to a predetermined elevation above the earth and releasing the mass to fall by gravity and accelerating the fall by the application of magnetic induction to the mass at spaced apart intervals longer than the period of discharge of capacitor banks included by the means for applying magnetic induction.

3. The method of setting up impact vibrations in the earth comprising lifting a mass of magnetic material of predetermined weight to a predetermined elevation above the earth spacing magnetic coils with centers of buoyancy in advance of said mass in direction of fall, releasing the mass to fall and energizing the coils successively to accelerate said mass as it falls into the fields of successive coils without overlap of the effects of adjacent fields, and employing timed magnetic means to automatically return the mass to initial elevation after it reaches bottom, whereby a predetermined succession of impacts may be produced.

4. Apparatus for sending strong impulses into the earth to be reflected back into the overburden in strength to be picked up for effective seismographic interpretation, said apparatus comprising a non-magnetic column disposed to upstand at predetermined height above earth level, a magnetizable mass of predetermined weight and plan area, and lift magnet means electrically energizable to lift said mass to the top of said column, latch means on said column mechanically yieldable to let said mass pass thereabove and thereafter extendable to normal latching position, and electrically retractable to release said mass to fall, fall accelerating magnet means supported on said column below the top position of said mass, and electrically energizable to accelerate the fall of said mass as it is released, as aforesaid, whereby said mass, with substantially full plan area, strikes the earth at substantially said earth level at the bottom of said column with energy greatly in excess of that gathered by gravity, so that extremely strong impulses are set in motion to pass downwardly into the earth, said fall accelerating magnetizable means comprising a plurality of magnets, spaced one below the other at predetermined distance, and whereby said magnets are energized by respective electrical circuits with a lead circuit discharging before the following circuit becomes effective as an acceleration means.

5. Apparatus for sending strong impulses into the earth to be reflected back into the overburden in strength to be picked up for effective seismographic interpretation, said apparatus comprising a non-magnetic column disposed to upstand at predetermined height above earth level, a magnetizable mass of predetermined weight and plan area, and lift magnet means electrically energizable to lift said mass to the top of said column, fall accelerating magnet means supported on said column below the top predetermined attained position of said mass, and electrically energizable to accelerate the fall of said mass as it is released, as aforesaid, whereby said mass, with substantially full plan area strikes the earth at substantially said earth level at the bottom of said column with energy greatly in excess of that gathered by gravity, so that extremely strong impulses are set in motion to pass downwardly into the earth, said fall accelerating magnet means comprising a plurality of magnets, spaced one below the other at predetermined distance and whereby said magnets are successively energized by respective electrical circuits.

6. The method of setting up impact vibrations in the earth comprising lifting a mass of magnetic material of predetermined weight to a predetermined elevation above the earth's surface, releasing the weight to fall by gravity and thereafter abetting the fall by the acceleration of induced magnetism by magnetic means disposed substantially below said predetermined elevation.

References Cited by the Examiner
UNITED STATES PATENTS

| | | | |
|---|---|---|---|
| 1,753,368 | 4/1930 | Du Bois-Reymond et al. | 181—.5 |
| 2,745,507 | 5/1956 | Bodine | 181—.5 |
| 2,949,909 | 8/1960 | Macchioni et al. | 181—.5 |
| 2,967,302 | 1/1961 | Loveless | 173—117 |
| 3,054,464 | 9/1962 | Ondeck | 173—117 |
| 3,189,121 | 6/1965 | Vander Stoep | 181—.5 |

BENJAMIN A. BORCHELT, *Primary Examiner.*

SAMUEL FEINBERG, *Examiner.*

G. H. GLANZMAN, *Assistant Examiner.*